Feb. 14, 1928.

E. WILDHABER 1,659,226

METHOD OF FORMING HOBS

Filed March 13, 1922

INVENTOR
Ernest Wildhaber.
BY Wayne B Wells
ATTORNEY

Patented Feb. 14, 1928.

1,659,226

UNITED STATES PATENT OFFICE.

ERNEST WILDHABER, OF BROOKLYN, NEW YORK, ASSIGNOR TO NILES-BEMENT-POND COMPANY, OF NEW YORK, N. Y., A CORPORATION OF NEW JERSEY.

METHOD OF FORMING HOBS.

Application filed March 13, 1922. Serial No. 543,385.

My invention relates to methods of forming hobs and particularly to methods of forming hobs for cutting involute gear teeth.

One object of my invention is to provide a method of forming a hob with teeth having radially or non-radially arranged cutting faces, cut by straight or helical flutes, and having true involute helicoidal surfaces on the sides of the teeth.

Another object of my invention is to provide a method of forming a hob that shall consist in cutting straight flutes through a thread on a blank to form teeth having either radial or non-radially arranged cutting faces, and in forming true involute helicoidal surfaces on the sides of the teeth, the helicoidal surfaces formed on the two sides of the teeth having different leads each of which differs from the lead of the hob thread.

Another object of my invention is to provide a method of forming a hob that shall consist in cutting teeth on a blank, in relieving the cutting edges of the teeth, and in grinding the front cutting faces, the top and the sides of the teeth, the sides of the teeth being ground to true involute helicoids.

Another object of my invention is to provide a method of forming hobs that shall consist in cutting teeth on a blank, in relieving the teeth, in providing a grinding wheel having an axis in a plane parallel to the blank axis and at a predetermined distance from the blank axis, the grinding surface of the wheel making a predetermined angle with a plane perpendicular to the blank axis, in operating said wheel to grind a true involute helicoid on one side of the teeth, and in grinding a true involute helicoid on the opposite side of the teeth in a similar manner.

A further object of my invention is to provide a method of forming hobs that shall consist in cutting flutes through a thread on a blank to form teeth, in relieving the teeth, in grinding the front cutting faces and the tops of the teeth, in providing a grinding wheel having its axis in a plane parallel to the blank axis and at a predetermined distance from the blank axis, the wheel having a grinding surface making a' predetermined angle with a plane perpendicular to the blank axis, in operating said grinding wheel to grind a true involute helicoid on one side of the teeth, and in setting the grinding wheel with its axis in a different parallel plane and its grinding surface making a different angle with a plane perpendicular to the blank axis to form a true involute helicoid on the opposite side of the teeth.

Hobs, which are formed in accordance with my invention, are particularly adapted to form involute teeth on gear wheels but are not necessarily limited to such operation. Hobs may be formed in accordance with my invention for cutting screw threads, threads on taps and worm threads and, moreover, for performing various other similar operations. The forming of true involute helicoids of different leads on the sides of the teeth permit the teeth to be ground with ease and accuracy. Moreover, the forming of true involute helicoids on the sides of the teeth of the hob results in accurate involute teeth being cut by the hob.

In forming a hob from a blank, in accordance with my invention, it is preferable to form a thread which has approximate involute helicoidal sides. The thread may be formed in any suitable manner, as by means of a lathe tool or a formed milling cutter. Upon completion of the thread, flutes are cut on the blank through the thread for forming teeth. The flutes may be straight or helical as desired and according to the characteristics of the hob. Moreover, the flutes form either radially arranged or non-radially arranged cutting faces on the teeth. Preferably, non-radially arranged cutting faces are formed on the teeth by straight flutes. It is of course apparent, if the hob is set square with the work being operated on, the straight flutes will not give as smooth a cutting action as helical flutes. Moreover, if the helix angle of the hob is relatively large, the use of straight flutes will result in a blunt cutting edge on one side of the thread and a relatively sharp cutting edge on the other side of the thread. In such latter case, it is necessary to use helical cutting flutes which will be substantially perpendicular to the helix of the hob in order to maintain suitable cutting edges.

The teeth, formed by the flutes, are relieved in any suitable manner to approximately the finished size. The tops of the teeth must be relieved by the so-called "radial relief" and the sides of the teeth may be relieved by either radial relief or the so-called "axial relief". As will be pointed out hereinafter, the same relief may be formed on the sides of the teeth either by a radial or an axial relieving movement. Upon hardening of the hob with the teeth cut a trifle over size, the sides are ground to true involute helicoids. The front cutting faces and the tops of the teeth may be ground in any convenient or suitable manner. The wheel, which grinds the sides of the teeth, is preferably a cone-shaped wheel of comparatively large diameter as compared with the wheels now used for grinding hobs. The peripheral surface of the wheel, which is used for grinding the sides of the teeth, is set to make a predetermined angle with a plane perpendicular to the blank axis. Moreover, the axis of the grinding wheel is located in a plane which is parallel to and at a vertical distance from the blank axis. In different terms it may be stated the axis of the grinding wheel lies along a line which passes the axis of the blank or hob at least a distance which is smaller than the radius of the pitch circle of the hob. Thus, one side of the teeth is ground to an involute helicoid having a lead differing from the lead of the hob thread. Upon completion of the involute helicoid on one side of the teeth, the grinding wheel is set in a different plane parallel to the blank axis and with its grinding surface making a different angle with a plane perpendicular to the blank axis for grinding a true involute helicoid on the opposite side of the blank teeth. The last involute helicoid so formed has a lead which differs not only from the lead of the hob thread but also from the lead of the involute helicoid formed on the opposite side of the blank teeth.

Preferably, after hardening the blank, the front cutting faces are ground in accordance with the flutes which are cut through the thread. A narrow ribbon of the surface back of the cutting edge on one side of a tooth is then lightly ground to a true involute helicoid with a lead corresponding to the lead of the hob thread. Inasmuch as the teeth are over size and are relieved, it is apparent only a very small surface of the side of the tooth is engaged by the grinding wheel. An angle is assumed for setting the grinding surface of the wheel to cut a relieved surface and from such assumed angle the position of the axis of the wheel is figured in a manner to be hereinafter set forth. The grinding wheel, when set in accordance with the assumed angle, is tried on the side of the blank tooth having a narrow surface back of the front cutting edge ground to a true involute helicoid. If the grinding surface of the wheel grinds a surface on the tooth which matches the narrow surface ground back of the front cutting edge then the angle which the grinding surface makes with a plane perpendicular to the blank axis has been correctly assumed. However, if the wheel grinds a surface which does not correctly match the surface ground back of the front cutting edge then the angle must be changed and the position of the grinding axis again determined. In a very few trials the correct position of the grinding wheel can be determined.

The sides of the teeth are relieved preferably by moving the grinding wheel axis toward the blank in the predetermined plane parallel to the blank axis. Although the grinding wheel is not moved radially with respect to the blank axis, a relief is provided which may be called and which is called radial relief in the specification. If so desired, the grinding wheel may be moved axially with respect to the blank and produce exactly the same relief on the blank teeth.

Upon completion of the true involute helicoids on one side of the blank teeth, true involute helicoids are ground on the opposite side of the teeth in exactly the same manner. The new setting of the grinding wheel is determined in the manner above set forth. It may be noted, as before set forth, that the angle of the grinding surface relative to a plane perpendicular to the blank axis is different for the different sides of the blank teeth.

If so desired, a milling cutter, shaped in accordance with the above mentioned grinding wheel, may be positioned in accordance with the positions of the grinding wheel, as above set forth, to cut true involute helicoids on the sides of the blank. Moreover, if so desired, the threads on the blank may be formed to true involute helicoids in a manner to be hereinafter set forth. In cutting true involute helicoids on the sides of the teeth the axis of the blank has been used as a reference line but, if so desired, lines symmetrically placed with respect to the blank axis may be used as reference lines for cutting true involute helicoids on the sides of the teeth in the various rows.

The first conception of a hob for cutting teeth on gear wheels was a worm wherein an axial section is the same as the rack which is used as the basis for the gear system. Such a worm is formed by a tool having a straight cutting edge making a predetermined angle with a plane perpendicular to the blank axis and extending along a line passing through the blank axis. The straight cutting edge is assumed to be revolved and advanced with a uniform lead. The intersection of a surface so formed with a plane perpendicular to the blank axis is an Archimedes spiral and not an involute as is required. A hob so formed will not cut involute teeth on a gear wheel with the accuracy of a hob which is provided with teeth the sides of which are true involute helicoids.

When a hob has been formed by a radially arranged cutting edge, as above set forth, it is difficult to grind and maintain the surfaces of the sides of the hob teeth. It is well known that it is not possible to accurately grind a continuous screw thread with any degree of accuracy unless the lead of the thread is very small. The reason for the difficulty in grinding a screw thread is the inability of a grinding wheel to cut along the same cutting line by which the thread was formed. If it is difficult to grind a continuous screw thread, it is apparent that a relieved screw thread, which is attempted on the sides of the hob teeth, is even more difficult to grind. Therefore, in grinding screw thread hobs, it is apparent two errors are introduced, the theoretical error of the screw thread and the error effected in attempting to grind relieved screw threads.

In my companion application Serial No. 543,386 filed March 13, 1922 is disclosed and claimed hobs which are constructed in accordance with the methods disclosed in this application.

Figure 1:
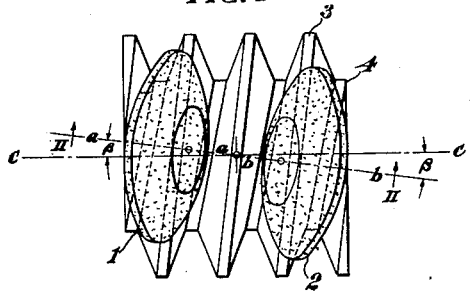
Figure 1 is a plan view of two cutting wheels which are set for forming a thread having true involute helicoids.
Figure 2:
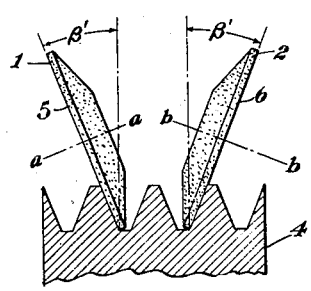
Fig. 2 is a sectional view along the line 11—11 of the blank and cutting wheels shown in Fig. 1.

Referring to Figs. 1 and 2, two cutting wheels 1 and 2 are shown in position for forming helicoidal sides on a thread 3 of a blank 4. The cutting wheels 1 and 2 may be either milling cutters or grinding wheels as desired and are shown provided with plane cutting faces 5 and 6. The cutting wheel 1 is assumed to rotate on an axis $a$—$a$ and the cutting wheel 2 is assumed to rotate on an axis $b$—$b$.

A hob which will cut involute teeth on a gear wheel should also cut straight sided teeth on a rack. Disregarding the teeth, which are formed on a hob, the continuous thread thereon should exactly mesh with a rack having straight sided teeth, if the hob is adapted to cut or mesh with a gear wheel having involute teeth. If the continuous thread of a hob is to mesh with a rack having straight sided teeth, it is customary to position the hob at a certain predetermined angle $\beta$ with respect to the rack.

In Figs. 1 and 2 of the drawing, a rack having straight sided teeth has not been shown but the cutting wheels 1 and 2 are shown in such position that the cutting surfaces 5 and 6 would engage two of the straight sides of the teeth of a rack if the blank were replaced by a rack. The rack should be placed to make an angle $\beta$ with the present position of the hob axis $c$—$c$.

The cutting faces 5 and 6 of the cutting wheels 1 and 2 are inclined to vertical planes in accordance with the pressure angle of the basic rack. It should also be noted that the axes $a$—$a$ and $b$—$b$ of the cutting wheels 1 and 2, make an angle $\beta$ with a vertical plane through the axis $c$—$c$ of the hob blank 4. The angular setting of each cutting surface 5 and 6 has been indicated by the character $\beta'$, in Fig. 2 of the drawing. The angle $\beta$ is generally taken equal to the lead angle of the hob at the so-called pitch radius thereof. Deviation from this rule does not introduce an error.

If the cutting wheels 1 and 2 are fed along the axis $c$—$c$ of the hob blank 4 while the blank is rotated in timed relation thereto, a helicoidal surface will be produced on each side of the blank thread. The thread thus produced is provided with sides which correctly engage the straight sides of a rack if the rack is positioned at an angle $\beta$ relative to the hob blank. Moreover, the hob blank will cut involute teeth, which will mesh with a rack having straight sided teeth, if teeth are formed in the thread by cutting flutes therethrough. As will be pointed out more clearly hereinafter, the surfaces which are cut on the blank thread by the plane surfaces of the cutting wheels 1 and 2 are involute helicoidal surfaces.

Preferably, a thread is cut on the blank in any suitable manner by either a formed milling cutter or a lathe tool prior to the cutting of the correct helicoids on the thread by the cutting wheels 1 and 2. The thread, which is formed by the cutting wheels 1 and 2, as is above set forth, is provided with involute helicoidal sides. The same method and the same setting of the cutting wheels will be utilized in determining certain angles for cutting relieved surfaces on the hob teeth, as will be hereinafter set forth.

In Figs. 1 and 2, the cutting wheels 1 and 2 are shown located above the hob blank 4. However, if so desired, the cutting wheel 1 and the hob blank may be conceived as being rotated on the axis $c$—$c$ of the hob until the axis $a$—$a$ of the wheel lies in a horizontal plane. In the same manner the cutting wheel 2 and the hob blank may be conceived as being rotated on the blank axis $c$—$c$ until the axis $b$—$b$ of the cutting wheel 2 is in a horizontal plane. Such changes in the relative positions of the cutting wheels and hob may be made if it is desired to operate the cutting wheels with their axes in horizontal planes. For simplicity in considering my invention, the cutting wheels will be considered in the position shown in Figs. 1 and 2 of the drawing.

If the two cutting wheels 1 and 2 are set and operated as above set forth, a thread will be formed on the hob blank which will mesh with a rack having straight sided teeth. The rack should be provided with straight sided teeth having a pressure angle $\beta'$ and the blank axis should be set at an angle $\beta$ with the rack. When cutting the blank thread, the cutting surface 5 of the wheel 1 and the cutting surface 6 of the wheel 2 each make an angle $\beta'$ with a vertical plane disposed perpendicularly to the horizontal line II—II, as shown in Fig. 2 of the drawing. Referring to Fig. 1 of the drawing, it may be stated the axis $a$—$a$ of the wheel 1 and the axis $b$—$b$ of the wheel 2 each make an angle $\beta$ with a vertical plane through the axis $c$—$c$ of the blank.

Figure 3:
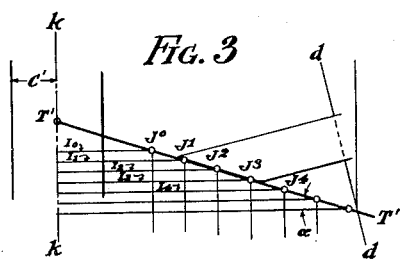
Figs. 3 and 4 are respectively side elevational and plan views of an involute helicoidal surface.
Figure 4:
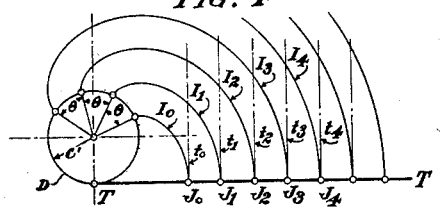

Referring to Figs. 3 and 4, the particular helicoidal surface which is to be formed on the hob teeth will be considered. The sides of the hob teeth, when relieved and ground, are preferably in the form of true involute helicoids. Heretofore, the side surfaces of hob teeth have been made in the form of screw surfaces. An involute helicoidal surface may be considered as being generated by rotating an involute on its axis and at the same time giving it an axial movement. The two movements must be performed in timed relation in order to effect a uniform lead. An involute helicoidal surface may also be considered as being generated by screwing an involute along its axis.

In Fig. 4 $I_0$ is assumed to be an involute having a base circle D of a radius $c'$. The involutes $I_1$, $I_2$, $I_3$ and $I_4$ are similar involutes separated from each other on the base circle D by equal angles $\theta$. The involute $I_1$ may be considered as the involute $I_0$ rotated through an angle $\theta$ and the remaining involutes may be considered as the involutes $I_0$ rotated through multiples of the angle $\theta$. The various involutes differ from each other not only in their angular position with respect to the base circle D but also in their position on a base cylinder considered formed with a radius $c'$. The various involutes are considered to be displaced from each other equal distances in a direction perpendicular to the base circle D shown in Fig. 4. Such displacement of the involutes is indicated in Fig. 3.

In Fig. 3 the involutes $I_0$, $I_1$, $I_2$, $I_3$ and $I_4$ are illustrated by straight horizontal lines which are separated by equal distances. The involutes are equidistant from each other by reason of considering them to be separated from each other by equal angles $\theta$. The line T—T, shown in Fig. 4 of the drawing, is assumed to be tangent to the base circle D and the points $J_0$, $J_1$, $J_2$, $J_3$ and $J_4$ are assumed to be the intersection points of the involutes with such tangent line. The intersection points are equidistant from each other by an amount equal to the arc of the angle $\theta$ on the base circle D. The above statement as to the distances subtended on the tangent line between points of intersection with the involutes being equal to the arcs on the base circle is true by reason of a characteristic quality of the involute. The involutes have been assumed to be separated by equal angles $\theta$ on the base circle in order to set off equal distances on the tangent line. Equal distances are desired on the tangent line for simplicity in determining the characteristic angle of the involute helicoid.

The axial distance along the center line $k$—$k$ between two involutes, which are rotated relative to each other one full revolution on the base circle, is equal to the lead of the surface being considered. The axial distance between two involutes, which are separated by an angle $\theta$ on the base circle, is therefore in the same proportion to the lead as the angle $\theta$ is to an angle of 360 degrees. When measuring the angles in arcs (on a circle of unit radius) a complete rotation of an angle of 360 degrees corresponds to an angle equal to $2\pi$. Thus, if the lead of the surface being considered is considered equal to $L'$ then the axial distance between two involutes is equal to $$\frac{\theta}{2\pi}L'.$$

One characteristic quality of the involute may therefore be expressed by stating that equidistant points $J_0$, $J_1$, $J_2$, $J_3$ and $J_4$ on the line T—T tangent to the base circle D in Fig. 4 correspond to axially equidistant points $J^0$, $J^1$, $J^2$, $J^3$ and $J^4$ in Fig. 3. Moreover, an involute is always normal to a tangent of the base circle. Thus, in Fig. 4 of the drawing, each of the involutes $I_0$, $I_1$, $I_2$, $I_3$ and $I_4$ is perpendicular to the line T—T. It may also be stated that the lines $t_0$, $t_1$, $t_2$, $t_3$ and $t_4$, which are tangent to the involutes $I_0$, $I_1$, $I_2$, $I_3$ and $I_4$ at the points $J_0$, $J_1$, $J_2$, $J_3$ and $J_4$ are also perpendicular to the line T—T at points $J_0$, $J_1$, $J_2$, $J_3$ and $J_4$.

In Fig. 3, it will be noted the involutes $I_0$, $I_1$, $I_2$, $I_3$ and $I_4$ respectively end at the points $J^0$, $J^1$, $J^2$, $J^3$ and $J^4$. Moreover, inasmuch as the points $J^0$, $J^1$, $J^2$, $J^3$ and $J^4$ are vertically and horizontally equidistant they must lie on the straight line T'—T'. The points $J^0$, $J^1$, $J^2$, $J^3$ and $J^4$ are vertically and horizontally equidistant from each other by reason of the involutes being separated from each other by equal angles on the base circle D. The tangents $t_0$, $t_1$, $t_2$, $t_3$, and $t_4$, to the involutes, as shown in Fig. 4, are located in one plane which evidently is a plane tangent to the involute helicoidal surface being considered. The tangent plane evidently touches the involute helicoidal surface in a straight line, which contains all the points $J_0$, $J_1$, $J_2$, $J_3$ and $J_4$ in the line T—T, shown in Fig. 4 and all the points $J^0$, $J^1$, $J^2$, $J^3$ and $J^4$ contained in the line T'—T', shown in Fig. 3 of the drawing. It may be noted the line T'—T' in Fig. 3 is the line T—T in Fig. 4 and the points $J^0$, $J^1$, $J^2$, $J^3$ and $J^4$ in Fig. 3 are points $J_0$, $J_1$, $J_2$, $J_3$ and $J_4$ in Fig. 4.

The inclination $\alpha$ of the contact line T'—T', shown in Fig. 3, and the line T—T, shown in Fig. 4, can be readily determined from the diagram shown in Fig. 3. Considering a triangle to be formed by one of the involutes in Fig. 3, the line T'—T' and a line parallel to the center line $k$—$k$, the tangent $\alpha$ is determined.

$$\tan \alpha = \frac{\text{vertical distance between two involutes}}{\text{horizontal distance between the ends of two involutes.}}$$

The vertical distance between two involutes, as heretofore set forth, is equal to $$\frac{\theta}{2\pi} L'.$$

The horizontal distance between the ends of any two involutes is equal to $c'\theta$.

Therefore, $$\tan \alpha = \left(\frac{\theta}{2\pi} L'\right) \div c'\theta = \frac{L'}{2\pi c'}.$$

An involute helicoidal surface must evidently show the same profile when corresponding sections are taken through it. Any axial section, which may be considered as any section made by a plane containing the axis, produces the same profile. The intersection lines are the same and are only located in different axial positions. Moreover, the same profile is shown by intersections taken parallel to the axis of the involute helicoid and at the same distance from the axis. The above conditions necessarily result, when considering a helicoidal surface, inasmuch as such a surface is considered as being produced by rotating and advancing at a constant rate a constant line. Therefore, the involute helicoidal surface, illustrated in Fig. 4, must produce a straight profile or line, similar to T'—T' in Fig. 3, not only in the considered section shown in Fig. 3 but in all sections which are taken through the involutes tangent to the base circle D.

The involute helicoidal surface may be considered as composed of straight lines which have an inclination $\alpha$ $$\left(\tan \alpha = \frac{L'}{2\pi c'}\right)$$

and are tangent to the base circle or base cylinder. It is the above characteristic of an involute helicoid which makes such a surface especially valuable in cutting or grinding hobs. It should be noted there is only one tangent plane along the whole length of the line T'—T' whereas in a screw surface, which can also be considered as being composed of straight lines, there are changing tangent planes at the different points of any one straight profile. A screw surface is considered to be formed by setting a straight cutting edge in a plane containing the blank axis, the blank being rotated and the cutting edge being advanced at a uniform rate, as has heretofore been set forth. From the above statements it is apparent a hob composed of involute helicoidal surfaces may be cut or ground with extreme accuracy whereas a hob composed of screw surfaces cannot be ground with anyways near the same accuracy.

An involute helicoidal surface may be conveniently cut by a cutting wheel 8 in the position shown in Fig. 3 of the drawing. In Fig. 3, it will be noted one of the straight profile lines of the cutting wheel coincides with the line T'—T'. The surface of the cutting wheel is also tangent to the plane which is tangent to the involute helicoidal surface along the line T'—T'. The conical surface of the cutting wheel 8 must remain on one side of the line T'—T', in Fig. 3 of the drawing, in order to produce a true involute helicoidal surface. The axis $d$—$d$ of the conical cutting wheel 8 must be located in a plane which passes through the line T—T and which is parallel to the axis $k$—$k$ of the involute helicoidal surface being considered. The plane, containing the axis of the wheel, is therefore a plane tangent to the base cylinder of the involute helicoid.

If a cutting wheel is set in accordance with the above conditions, an involute helicoidal surface will always be produced. Thus, an involute helicoidal surface will always be produced, when the cutting surface of the cutting wheel makes an angle $\alpha$ with a plane perpendicular to the blank axis and the following relation exists:

$$c' = \frac{L'}{2\pi \tan \alpha} \text{ or } \tan \alpha = \frac{L'}{2\pi c'}.$$

$L'$, as heretofore set forth, is the lead of the considered surface. The distance $c'$ may not only be considered the radius of the base cylinder of the considered involute helicoid but also may be considered the distance apart of the elongation of the axis $k$—$k$ of the blank or involute helicoid and the elongation of the axis $d$—$d$ of the cutting wheel. It may also be stated in other words, the elongations of the axis of the blank and the cutting wheel pass each other at a distance equal to $c'$.

When considering a wheel having a plane cutting surface, it is evidently immaterial where the axis of the cutting wheel is located. The cutting plane, however, must always make an angle $\alpha$ with a plane perpendicular to the blank axis. It may also be stated that the cutting plane must always make an angle of $90°—\alpha$ with the axis of the blank. A lead $L'$ being provided and the cutting surface of a grinding wheel being set at an angle $\alpha$, as above set forth, an involute helicoidal surface, having a base cylinder with a radius $$c' = \frac{L'}{2\pi \tan \alpha},$$

will be generated. Accordingly there are no restrictions regarding the distance between the axis of the blank and the axis of the cutting wheel. A plane cutting wheel will always produce an involute helicoidal surface if the cutting plane of such wheel covers a sufficient part of a tangent plane of the type being considered. It is evident that the unrelieved helicoidal surface of a hob should be an involute helicoidal surface inasmuch as it can be conveniently produced by cutting planes.

According to my invention the relieved surfaces on the sides of the hob teeth are made involute helicoidal surfaces. The side surfaces of the hob teeth necessarily have a different lead from the lead of the continuous thread on the hob. Moreover, the lead of the helicoidal surface on one side of the hob teeth differs from the lead of the helicoidal surface on the other side of the hob teeth. The lead of the relieved surfaces on the sides of the teeth must consist of two parts, namely, the lead $L$ of the continuous thread and the lead due to the relieving movement. The two involute helicoidal surfaces on the sides of the teeth should also be produced by cutting surfaces set at different angles $\alpha$.

The sides of the hob teeth may be relieved either by the so-called axial or the so-called radial relief. As will be hereinafter set forth, when reference is made to Fig. 9 of the drawing, a radial relieving movement is always equivalent to a certain amount of axial relieving movement. The relieving of the hob teeth by a relieving motion taking place in an axial direction will be considered first for simplicity. The axial or side relief for one complete revolution of the blank is assumed to equal $A_t'$. Therefore, the lead of the relief surface on one side of the blank teeth is $L'=L+A_t'$. Moreover, the lead on the other side of the hob teeth is $L'=L-A_t'$. Assuming N to be the number of flutes cut in the hob and $A'$ to be the relief per tooth then $A_t'=NA'$. The flutes in this case are considered to be cut straight or parallel to the axis of the blank.

If the blank is provided with spiral flutes, it is evident that the cutting surface will not engage exactly N teeth per revolution of the blank on account of the inclination of the flutes. It is a well known fact that with a lead $L_t$ for the flutes, the number of teeth which will be engaged per revolution is equal to $$N\left(1+\frac{L}{L_t}\right).$$

Therefore, when considering a hob having spiral flutes the relief per revolution, is $$A_t' = A'N\left(1+\frac{L}{L_t}\right).$$

Accordingly, the lead of the relieved surface on the sides of the hob teeth is $$L' = L \pm A'N\left(1+\frac{L}{L_t}\right).$$

Figure 7:
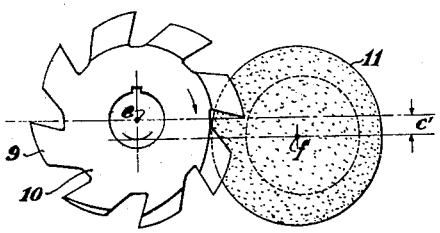
Figs. 7 and 8 are side elevation and plan views illustrating the relieving of teeth having involute helicoidal sides when the cutting wheel is moved axially with respect to the blank.
Figure 8:
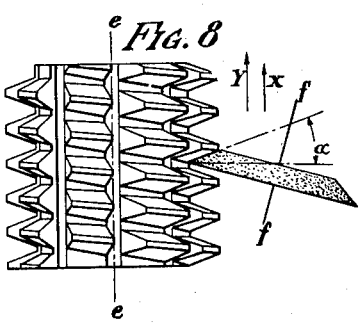

Referring to Figs. 7 and 8 of the drawing, the relieving of the teeth 9 of a hob 10 by side relieving movements will be considered. The axis $e$—$e$ of the hob blank is assumed to be in a horizontal position, as shown in Fig. 7, for convenience in considering the position of a cutting wheel 11. The axis $f$—$f$ of the cutting wheel is also assumed to be in a horizontal plane. It is assumed the cutting wheel 11 may be adjusted about a vertical axis in order to vary the angle $\alpha$ which the cutting surface makes with a plane perpendicular to the blank axis. The cutting wheel should be adjustable in the horizontal plane containing its axis to compensate for wear of the cutting wheel and also for taking care of hob blanks of different diameters. Provision should also be made for raising and lowering the plane of movement of the axis $f$—$f$ for the cutting wheel 11 in accordance with the different values of $c'$. The distance $c'$ between the plane of the blank axis and the plane of the axis for the cutting wheel 11 is measured above or below the horizontal plane of the blank in accordance with the thread of the hob and the side of the thread on which the cutting wheel is being operated. It should also be noted that the grinding or cutting line, along which cutting takes place between the cutting wheel and the generated helicoidal surface, must always be a tangent to the helix on the base cylinder.

When considering a left hand thread, as shown in Figs. 7 and 8 of the drawing, it is necessary to lower the cutting wheel 11 a distance $c'$ below the horizontal plane through the blank axis. In Fig. 8 of the drawing it will be noted the lower sides of the blank teeth are being cut.

The hob blank 10 is assumed to be rotated on the axis $e$—$e$ at a constant rate and the cutting wheel 11 is assumed to be fed in the direction of the arrow $y$, as shown in Fig. 8 of the drawing. The movement of the cutting wheel is assumed to be effected in timed relation to the rotation of the hob blank so that for each revolution of the hob blank 10, the cutting wheel is moved axially a distance equal to the lead 1. The cutting wheel 11 also effects relieving movements in the direction of the arrow $x$, as shown in Fig. 8 of the drawing. When the total relief per revolution of the blank is $A_t'$ then an involute helicoidal relief surface will be generated if the vertical setting of the cutting wheel has been determined in accordance with the equation $$c' = (L + A_t') \div 2\pi \tan \alpha'.$$

When cutting the opposite sides of the teeth, the relief $A_t'$ is in the opposite direction as the axial travel of the cutting wheel 11 on account of the direction of the lead L. The corresponding vertical setting when grinding the opposite sides of the teeth will then be in accordance with the equation $$c'' = (L - A_t') \div 2\pi \tan \alpha''.$$

Thus, true involute helicoidal surfaces are obtained and it will be shown hereinafter how the proper involute helicoidal surface may be easily selected.

Figure 9:
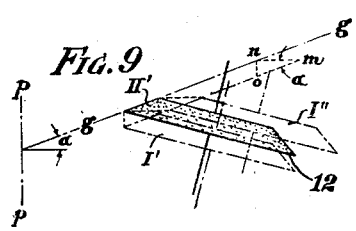
Fig. 9 is a diagrammatic view comparing a radial and an axial movement of the grinding wheel for relieving the teeth on a blank.

The term "radial relief," when used in this application, is intended to refer to a relief which is effected by relieving movements in any plane parallel to the blank axis and in a direction towards the blank axis. Thus, referring to Fig. 7 of the drawing, radial relief will be considered to be effected when the cutting wheel 11 is moved towards the blank 10. Although radial relief is generally considered to be effected along radial lines, it is believed the above mentioned relief may be called radial relief. Referring to Fig. 9 of the drawing, it will be shown that a certain axial relief is the equivalent of a certain amount of the so-called radial relief. The cutting edge of a cutting wheel 12 is shown to lie along the line $g$—$g$. The line or cutting edge $g$—$g$ is assumed to make an angle $\alpha$ with a plane perpendicular to the axis $p$—$p$ of a blank or hob. Such position of the wheel 12 is indicated in Fig. 9 of the drawing by the reference numeral II'. The position of II' of the cutting wheel 12 may be obtained either by a radial movement or an axial movement of the cutting wheel. Assuming the cutting wheel to be in the dotted line position indicated by the reference numeral I'', it is apparent the position of II' of the cutting wheel may be reached by moving it directly towards the blank. Moreover, if the cutting wheel is in a position I' as indicated by dotted lines, the position II' may be reached by giving the cutting wheel a movement parallel to the axis of the blank. Considering the cutting edge of the cutting wheel to make an angle $\alpha$ with a plane perpendicular to the axis $p$—$p$ of the blank, it is apparent in the triangle MNO, shown in Fig. 9 of the drawing, that $$\text{tangent } \alpha = \frac{NO}{MN}.$$

The line NO represents the amount of side relief necessary to produce a certain relief on the blank teeth. The line MN represents the amount of radial relief necessary to produce the same relief on the teeth of the blank. Accordingly, $$\tan \alpha = \frac{\text{side relieving movement}}{\text{radial relieving movement}}.$$

The side relief, which corresponds to a given radial relieving movement, is therefore:

$$(\text{radial relief}) \tan \alpha.$$

When considering radial relief the lead of relieving surface is evidently $$L' = L \pm A_t' \tan \alpha.$$

The character $A_t'$ is considered to be the total relief for one revolution of the hob blank. The teeth on a hob may be relieved by a combination of so-called radial and side relief which would mean moving the cutting wheel in an oblique direction with respect to the axis of the blank. Inasmuch as there is no particular advantage obtained in such oblique relief, it is deemed unnecessary to explain the same in detail.

Figure 5:
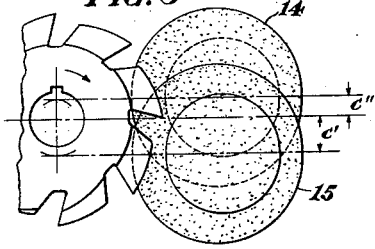
Fig. 5 is an end elevation view showing two cutting wheels set for cutting true involute helicoids on the sides of the teeth of a blank.
Figure 6:
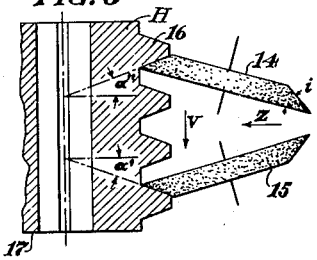
Fig. 6 is a plan view, partially in section, of the blank and wheels shown in Fig. 5.

Referring to Figs. 5 and 6 of the drawing, two cutting wheels 14 and 15 are shown in position for cutting relieved involute helicoidal surfaces on the teeth 16 of a hob blank 17. The relieving movements are assumed to be effected by moving the cutting wheels towards the hob blank in planes parallel to a horizontal plane through the blank axis. It is assumed the hob is provided with a right hand thread and that the cutting wheels are moved continuously in a direction indicated by the arrow $v$, in Fig. 6 of the drawing during the rotation of the blank 17. The movement of the cutting wheels along the blank is assumed to be effected in timed relation to the blank rotation. Thus, the cutting wheels are moved a distance equal to the lead L of the unrelieved thread for each revolution of the hob blank. In addition to the movement of the cutting wheels in the direction of the arrow $v$, relieving movements are effected in the direction indicated by the arrow $z$. Such relieving movements are in planes parallel to a horizontal plane through the blank axis and in a direction towards the blank.

The axis of the cutting wheel 14 is set in a horizontal plane which is located a distance $c''$ above the horizontal plane through the blank axis. The distance $c''$ is obtained by solving the equation, $$c'' = \frac{L}{2\pi \tan \alpha''} - \frac{A_t'}{2\pi}.$$

The axis of the cutting wheel 15 is set in a horizontal plane a distance $c'$ below the horizontal plane through the blank axis. The distance $c'$ is obtained by solving the equation, $$c' = \frac{L + A_t' \tan \alpha'}{2\pi \tan \alpha'} = \frac{L}{2\pi \tan \alpha'} + \frac{A_t'}{2\pi}.$$

It should be noted the cutting surfaces of the cutting wheels 14 and 15 make different angles with planes perpendicular to the blank axis. Thus, the wheel 14 is set so that its cutting surface makes an angle $\alpha''$ with a plane perpendicular to the blank axis, whereas the cutting wheel 15 is so set that its cutting surface makes an angle $\alpha'$ with a plane perpendicular to the blank axis. The different values of $\alpha$ are caused by the different leads on the two relieved sides of the hob teeth. If the hob is provided with helical flutes, it is apparent for certain helices the values of the angles $\alpha$ for the two wheels may be the same.

It is apparent, if so desired, the feeding movement, which has been described as being effected by the cutting wheels, may be effected by the hob blank. It is also possible, if so desired, to dispose the cutting wheels either above or below the hob blank. The value of the angle $\alpha$ for setting the cutting edge of a cutting wheel may be determined by trial in the manner to be set forth. A hob is preferably made in a customary manner with relieved surfaces. A thread may be first formed on the blank and the sides of such thread need not necessarily be cut to true involute helicoidal surfaces. Preferably, the thread is cut by a lathe tool or a formed milling cutter. Upon completion of the thread, suitable flutes, which may be helical or straight, are cut on the blank for forming teeth. The teeth, thus formed, are then relieved in any suitable manner so as to form teeth which are somewhat oversize. The teeth may have true involute helicoids cut on their sides, if so desired. The blank is then hardened. After the blank has been hardened, a wheel is set to grind a true involute helicoidal surface on one side of a tooth without any relief. Inasmuch as the teeth have been relieved, it is apparent the wheel will only grind a very narrow ribbon of unrelieved surface on the side of the tooth.

An angle $\alpha$ is assumed for setting the cutting surface of a wheel. From such assumed angle $\alpha$ the distance of the plane of movement of the axis of the wheel above or below the horizontal plane through the blank axis is figured. Thus, an approximate angle $\alpha$ is assumed and the value of $c'$ is obtained from the equation $$c' = \frac{L}{2\pi \tan \alpha} \pm \frac{A_t'}{2\pi}.$$

A cutting wheel, which is set in accordance with the assumed angle $\alpha$ and the figured distance $c'$, is tried on the side of the blank tooth having a narrow surface back of the front cutting edge ground to a true involute helicoid. If the cutting surface of the wheel cuts a surface on the tooth, which matches the narrow surface ground back of the front cutting edge, then the angle $\alpha$ which the cutting surface makes with a plane perpendicular to the blank axis has been correctly assumed. However, if the wheel does not cut a surface which correctly matches the surface cut back of the front cutting edge then the angle $\alpha$ must be changed and the distance $c'$ again figured. In a very few trials the correct position of the cutting wheel may be determined.

The contour cutting of the hob teeth or the cutting of a small ribbon of unrelieved surface back of the cutting faces is effected in the same manner as a continuous thread is cut on a hob. Such contour grinding or cutting may be performed as outlined in describing Figs. 1 and 2 of the drawing. The term "cutting wheel" used in this specification is intended to cover either a milling cutter or a grinding wheel. It is apparent that either a milling cutter or a grinding wheel may be set in accordance with my invention and cut relieved involute helicoidal surfaces. The flutes, which are cut on the hob, may be any desired shape and the cutting faces may be radially or non-radially arranged. Preferably, a hob constructed in accordance with my method will have straight flutes and teeth with non-radially arranged cutting faces. Before contour grinding or cutting the teeth of a hob in the above indicated manner to form a small unrelieved surface back of one cutting face, it is necessary to grind the front cutting face of the tooth.

As has already been set forth, a different angle and a different value of $c'$ is necessary in cutting opposite sides of the blank teeth. The value of $\alpha$ and the value of $c'$ for cutting the opposite sides of blank teeth are determined in the manner above set forth. Upon completion of the cutting of the sides of the blank teeth, the top surfaces of the blank teeth are cut or ground in any suitable manner. The tops of the teeth are so cut that the effective contour behind each cutting surface is the same at successive surfaces of intersection similar to the initial cutting face. If so desired different relief may be cut on the opposite sides of the hob teeth but preferably the same relief is formed on the two sides of the hob teeth.

It will be understood that such changes and modifications may be made in my invention as fall within the limits of the appended claims.

What I claim is:

1. The method of forming a hob, which consists in forming an approximate involute thread on a blank, in cutting flutes on the blank through the thread to form teeth, in relieving the teeth on the blank, in grinding the front cutting faces of the teeth, and in grinding the side faces of the teeth to involute helicoids, whereby the effective contour behind each cutting surface is the same at successive surfaces of intersection similar to the initial cutting face.

2. The method of forming a hob, which consists in forming a thread on a blank, in cutting flutes on the blank to form teeth, in providing a cutting wheel having its axis located in a plane parallel to the blank axis and having a cutting surface which makes a predetermined angle with a plane perpendicular to the blank axis, in operating said wheel to relieve one side of the teeth on the blank, said parallel plane being so located and said predetermined angle being of such size that the relieving movements of the wheel form involute helicoidal surfaces, and in relieving the opposite sides of the blank teeth in a similar manner.

3. The method of forming a hob, which consists in forming an approximate involute thread on a blank, in cutting flutes on the blank to form teeth, in relieving one side of the blank teeth by a cutting wheel having its axis located in a plane parallel to the blank axis, the cutting wheel having a cutting surface which makes a predetermined angle with a plane perpendicular to the blank axis, said parallel plane being so located and said predetermined angle being of such size that the relieving movements of the wheel form involute helicoidal surfaces, in relieving the opposite sides of the blank teeth in a similar manner, and in grinding the side faces of the teeth, whereby the effective contour behind each cutting surface is the same at successive surfaces of intersection similar to the initial cutting face.

4. The method of forming a hob, which consists in forming teeth on a blank, in relieving the teeth on the blank, in grinding the front cutting faces of the teeth, in grinding one side of the teeth by a conical grinding wheel, the axis of said wheel being located in a plane parallel to the blank axis and the grinding surface making a predetermined angle with a plane perpendicular to the blank axis, said parallel plane being so located and said angle being of such size that the relieving movements of the wheel form involute helicoidal surfaces, and in relieving the opposite sides of the blank teeth in a similar manner.

5. The method of forming a hob, which consists in forming teeth on a blank, in radially relieving the teeth on the blank, in grinding the front cutting faces of the teeth, in grinding one side of the blank teeth by a grinding wheel having an axis located in a plane parallel to the blank axis and at an oblique angle to the axis of the blank, the grinding surface of said wheel making a predetermined angle with a plane perpendicular to the blank axis, said parallel plane being so located and said predetermined angle being of such size that the wheel forms involute helicoidal surfaces on the teeth, and in grinding the opposite sides of the blank teeth in a similar manner.

6. The method of forming a hob, which consists in forming teeth on a blank, in relieving the teeth formed on the blank, in grinding one side of the blank teeth by a wheel having an axis located in a plane parallel to the blank axis, the grinding surface of said wheel making a predetermined angle with a plane perpendicular to the blank axis, said plane being so located and said angle being of such size that the wheel forms involute helicoidal surfaces on the teeth, and in grinding the opposite sides of the teeth to form involute helicoidal surfaces, the position of the parallel plane and the size of the predetermined angle being changed in the second grinding operation.

7. The method of forming a hob, which consists in forming teeth on a blank, in relieving the teeth, in grinding the front cutting faces of the teeth, and in grinding each of the side surfaces of the teeth by a grinding wheel having an axis which lies along a line that passes the blank axis at a distance less than the radius of the hob pitch circle.

8. The method of forming a hob, which consists in forming teeth on a blank, in relieving the teeth, in grinding the front cutting faces of the teeth, and in grinding each of the side surfaces of the teeth by a grinding wheel having a horizontal axis located at a vertical distance from the horizontal plane containing the blank axis.

9. The method of forming a hob, which consists in forming teeth on a blank, in relieving the teeth, and in grinding each of the side surfaces of the teeth by a grinding wheel, a plane through the axis of the grinding wheel and parallel to the direction of the relieving movements being located a predetermined distance from a similar parallel plane through the axis of the blank.

10. The method of forming a hob, which consists in forming teeth on a blank, in radially relieving the teeth, in grinding the front cutting faces of the teeth, and in grinding helicoidal surfaces on each of the side surfaces of the teeth by a grinding wheel, a plane through the axis of the grinding wheel and parallel to the direction of the relieving movements being located at a predetermined distance from a similar parallel plane through the axis of the blank.

11. The method of forming a hob, which consists in forming teeth on a blank, in effecting relieving movements in a horizontal plane to relieve the teeth, and in grinding each of the side surfaces of the teeth by a grinding wheel having an axis located in a horizontal plane which is located a predetermined distance from a similar horizontal plane through the axis of the blank.

12. The method of forming a hob, which consists in forming undercut teeth on a blank, in effecting radial relieving movements in a horizontal plane to relieve the teeth, in grinding the front cutting faces of the teeth, and in grinding helicoidal side surfaces on the teeth by a grinding wheel having an axis located in a horizontal plane which is located a predetermined distance from a similar horizontal plane through the axis of the blank.

13. The method of forming a hob, which consists in forming teeth on a blank, in effecting relieving movements to relieve the teeth, and in cutting the side surfaces of the teeth by a cutting wheel having an axis located in a plane parallel to the plane of the relieving movements and at an oblique angle to the axis of the blank, the plane containing the wheel axis being located a certain distance from a parallel plane through the blank axis.

In testimony whereof, I hereto affix my signature.

ERNEST WILDHABER.